(12) United States Patent
Matsumoto (10) Patent No.: US 7,152,235 B2
(45) Date of Patent: Dec. 19, 2006

(54) OPTICAL DISK APPARATUS

(75) Inventor: Yoshimasa Matsumoto, Daito (JP)

(73) Assignee: Funai Electric Co., Ltd., Daito (JP)

( * ) Notice: Subject to any disclaimer, the term of this patent is extended or adjusted under 35 U.S.C. 154(b) by 533 days.

(21) Appl. No.: 10/767,255

(22) Filed: Jan. 30, 2004

(65) Prior Publication Data

US 2004/0184362 A1    Sep. 23, 2004

(30) Foreign Application Priority Data

Jan. 31, 2003    (JP)    ............... 2003-024875

(51) Int. Cl.
    *G11B 33/14*    (2006.01)
(52) U.S. Cl. .................................... 720/635
(58) Field of Classification Search ............... 720/604, 720/605, 635
    See application file for complete search history.

(56) References Cited

U.S. PATENT DOCUMENTS 6,704,266 B1 *    3/2004    Yanagiguchi ............... 720/635

FOREIGN PATENT DOCUMENTS

| JP | 09-139063 | 5/1997 |
|----|-----------|--------|
| JP | 2000-356206 | 12/2000 |
| JP | 2004-164721 | 6/2004 |

* cited by examiner

*Primary Examiner*—David Davis
(74) *Attorney, Agent, or Firm*—Crowell & Moring LLP (57) ABSTRACT

Each pivot shaft of a drive chassis has hooks to allow the drive chassis to be held by a main chassis. Preferably, each bearing portion of the main chassis corresponding to each of the pivot shafts has an engagement groove, while the main chassis has stoppers for preventing positional slippage of the pivot shafts. Thus, in case a force is applied to the drive chassis in a direction perpendicular to an optical disc insertion direction, the hooks of the each shaft of the drive chassis are stopped by an inner wall of the engagement groove and the stopper, respectively, of the main chassis. Thereby, the drive chassis is prevented from falling off the main chassis.

17 Claims, 7 Drawing Sheets

FIG. 1

TRAY INSERTION DIRECTION
(DISC INSERTION DIRECTION)

FIG. 2

TRAY INSERTION DIRECTION
(DISC INSERTION DIRECTION)

OPTICAL DISK APPARATUS

BACKGROUND OF THE INVENTION

1. Field of the Invention

The present invention relates to an optical disc apparatus for reproducing information, e.g., of video and audio, recorded on an optical disc such as a DVD (Digital Versatile Disc), more particularly to an optical disc apparatus comprising not only a main chassis but also a chassis for holding an optical disc drive.

2. Description of the Related Art

Conventionally, there is an optical disc apparatus having not only a main chassis but also a chassis for holding an optical disc drive (hereinafter simply referred to as drive chassis) in optical disc apparatus for reproducing e.g. video, audio and characters recorded on optical discs such as CD (Compact Disc), LD (Laser Disc) and DVD-ROM (DVD-Read Only Memory) or on magneto-optical discs such as MD (Mini Disc). In such kind of apparatus, the drive chassis generally comprises pivot shafts at opposite ends thereof in a direction perpendicular to an optical disc insertion direction. The drive chassis is coupled to the main chassis by engaging the pivot shafts with bearing portions of the main chassis. For clamping an optical disc, the drive chassis is pivoted about the axis of each pivot shaft, whereby the optical disc is sandwiched between a turntable of the drive chassis and a clamp of the main chassis.

Furthermore, in the field of apparatus comprising a magnetic disc unit and a printed circuit board, which uses a screw provided on an insulator for fixing the printed circuit board to the insulator, it is known that the insulator is provided with a hook for holding the screw in order to prevent the screw from falling off the insulator. (Refer, for example, to Japanese Laid-open Patent Publication Hei 9-139063.)

In addition, in the field of video camera apparatus, a structure for absorbing shocks in case the apparatus drops is known, such that a frame supports a mechanism unit via a screw lock washer coupled, by four S-shaped elastic strips, to the frame. (Refer, for example, to Japanese Laid-open Patent Publication 2000-356206.) This replaces use of a structure such that a frame supports a mechanism unit via a rubber bush.

However, the main chassis and the drive chassis are generally formed of flexible resin in the case of such optical disc apparatus as described above that the drive chassis is coupled to the main chassis by engaging, with the bearing portions of the main chassis, the pivot shafts provided at both ends of the drive chassis in a direction perpendicular to the optical disc insertion direction. Accordingly, in case a force is applied to the drive chassis in a direction perpendicular to the optical disc insertion direction, either one of the pivot shafts of the drive chassis is likely to be pressed against the main chassis to become bent. Thus, there has been a possibility that the pivot shaft of the drive chassis slips off the bearing portion of the main chassis, whereby the drive chassis falls off the main chassis.

Besides, if the technology described in Japanese Laid-open Patent Publication Hei 9-139063 as referred to above is applied to mount the pivot shafts at the opposite ends of the drive chassis to the bearing portions of the main chassis, the drive chassis becomes unable to be pivoted relative to the main chassis. Furthermore, even if the technology described in Japanese Laid-open Patent Publication 2000-356206 is applied to mount the drive chassis to the main chassis, it is still not possible to prevent the drive chassis from falling off the main chassis. Moreover, since the use of a screw lock washer having elastic strips becomes necessary therein, there has been a problem that the number of parts increases, resulting in a cost increase.

SUMMARY OF THE INVENTION

An object of the present invention is to provide such an optical disc apparatus that even in case the apparatus drops, pivot shafts of a drive chassis do not slip off bearing portions of a main chassis, whereby the drive chassis can be prevented from falling off the main chassis.

An optical disc apparatus in accordance with an aspect of the present invention comprises: a turntable for mounting an optical disc thereon; an optical pickup unit for reading out information recorded on the optical disc mounted on the turntable; an optical disc drive for rotating the turntable; a drive chassis formed of resin and provided for holding the turntable, the optical pickup unit and the optical disc drive, the drive chassis having pivot shafts at both ends thereof extending in a direction perpendicular to an optical disc insertion direction; and a main chassis having bearing portions for pivotably supporting the drive chassis.

Each of the pivot shafts of the drive chassis has a hook to allow the drive chassis to be held by the main chassis.

When a force is applied to the drive chassis in a direction perpendicular to the optical disc insertion direction, the hook of one of the pivot shafts which are parts of the drive chassis is stopped by the main chassis for preventing the drive chassis from falling off the main chassis.

In case the optical disc apparatus drops in a manner that a force is applied to the drive chassis in a direction perpendicular to the optical disc insertion direction, the hook of either one of the pivot shafts of the drive chassis is stopped by the main chassis. Accordingly, the drive chassis and the other one of the pivot shafts are prevented from being pressed against the main chassis to become bent. Thus, at the time of such dropping of the apparatus, each of the pivot shafts of the drive chassis can be prevented from slipping off the main chassis to cause the drive chassis to fall off the main chassis.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIGS. 4($a$) and 4($b$) are an enlarged schematic top plan view and an enlarged schematic side view, respectively, of a portion of the drive chassis corresponding to a dotted circle A in FIG. 2 before mounted to the main chassis;

DESCRIPTION OF THE PREFERRED EMBODIMENTS

An embodiment of the present invention will be described hereinafter with reference to the drawings.

Figure 1:
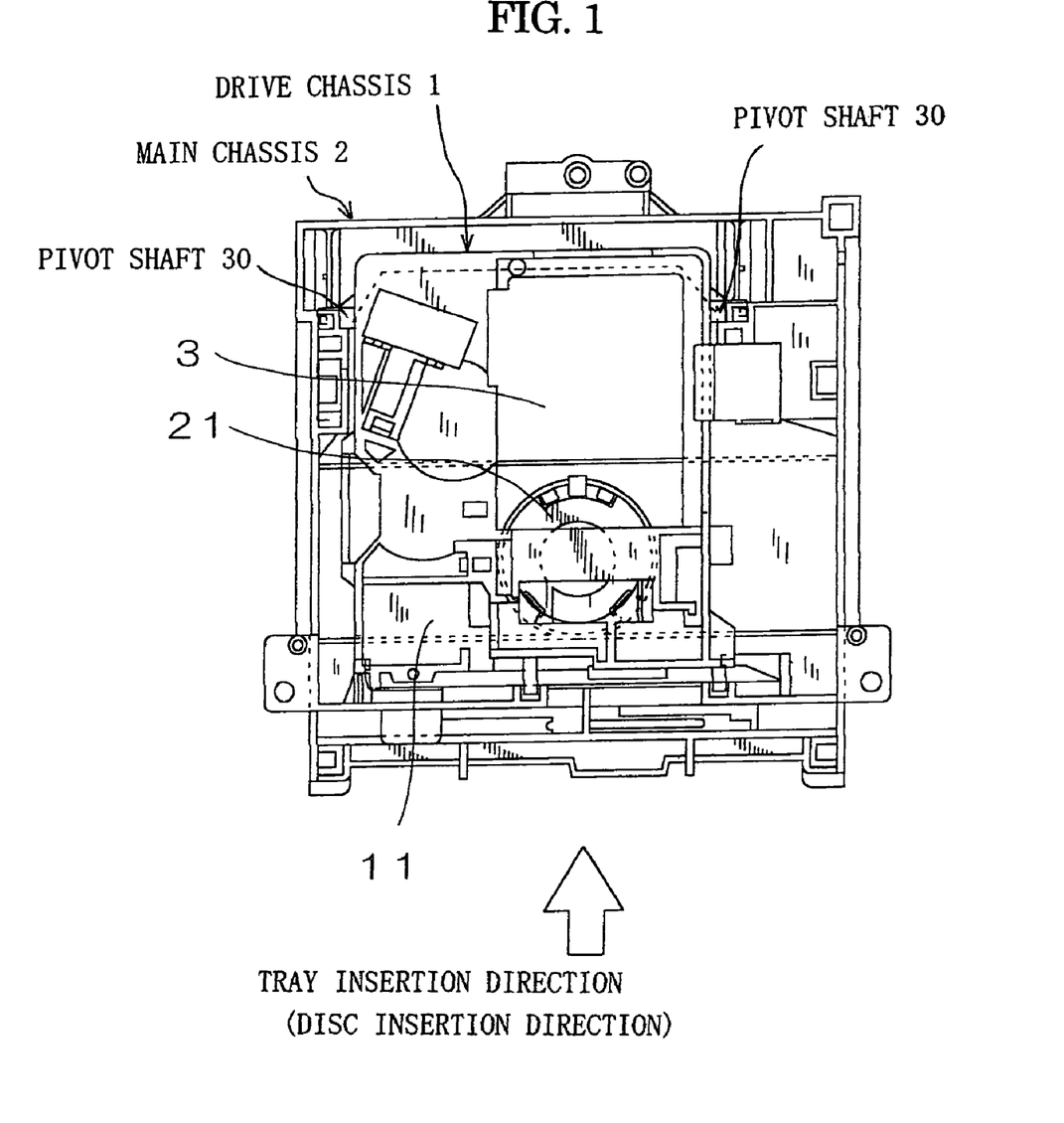
FIG. 1 is a schematic bottom view of a drive chassis and a main chassis of an optical disc apparatus according to an embodiment of the present invention.
Figure 2:
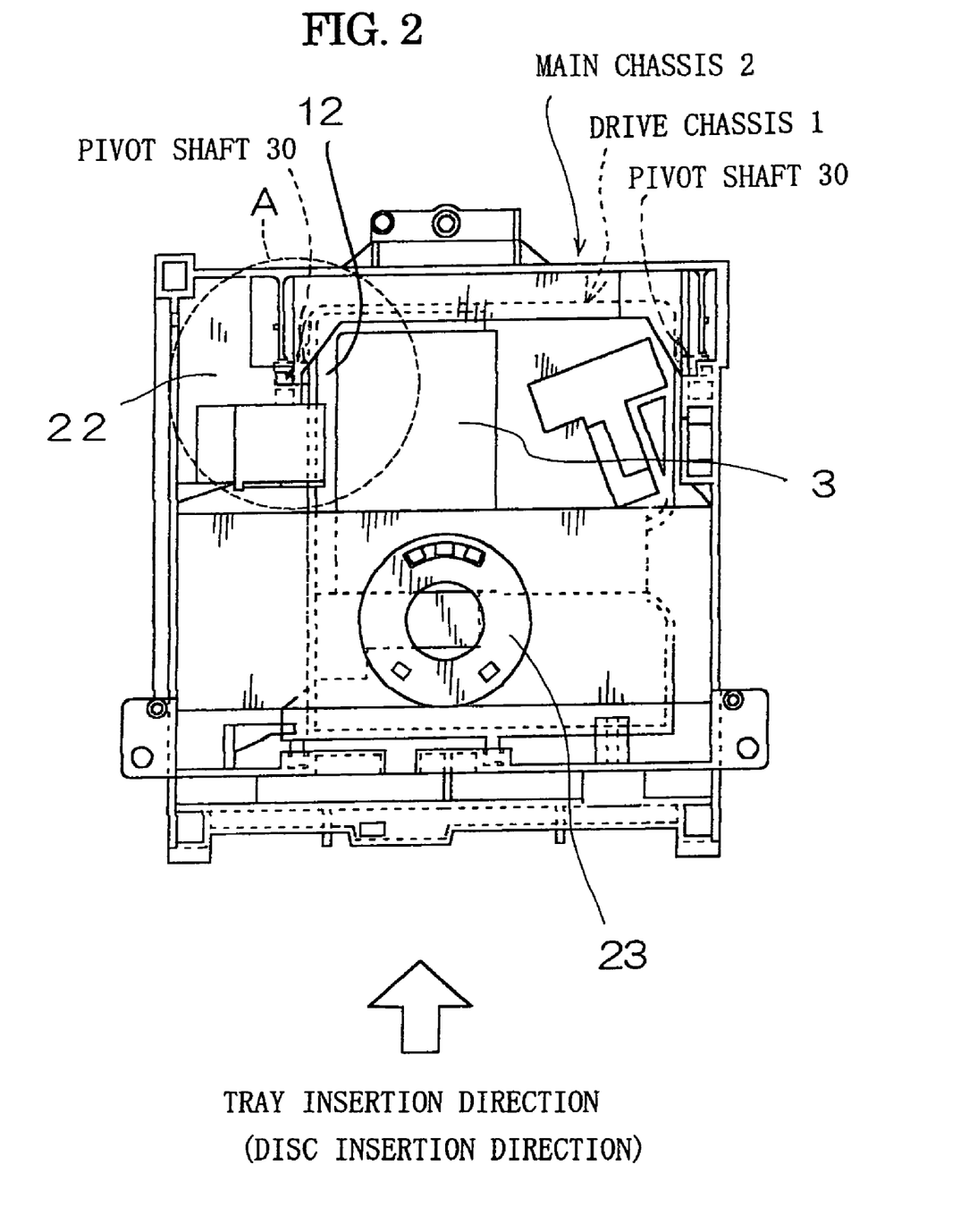
FIG. 2 is a schematic top plan view of the drive chassis and the main chassis.

A DVD (Digital Versatile Disc) player according to the present embodiment is of a type which comprises not only a main chassis but also a chassis for holding an optical disc drive (hereinafter simply referred to as drive chassis). These main chassis and drive chassis are formed of flexible resin. FIG. 1 and FIG. 2 each show the drive chassis 1 and the main chassis 2 of the DVD player (optical disc reproduction apparatus) according to the present embodiment as seen from the bottom side and the top side of the apparatus, respectively. In FIG. 1, reference numbers 11 and 21 designate a rear face of the drive chassis 1 and a rear face of the main chassis 2, respectively. In FIG. 2, reference numerals 12 and 22 designate a front face of the drive chassis 1 and a front face of the main chassis 2, respectively. On the other hand, FIG. 3 shows the main chassis 2 as seen from the bottom side of the apparatus before mounting the drive chassis 1 thereto.

Figure 3:
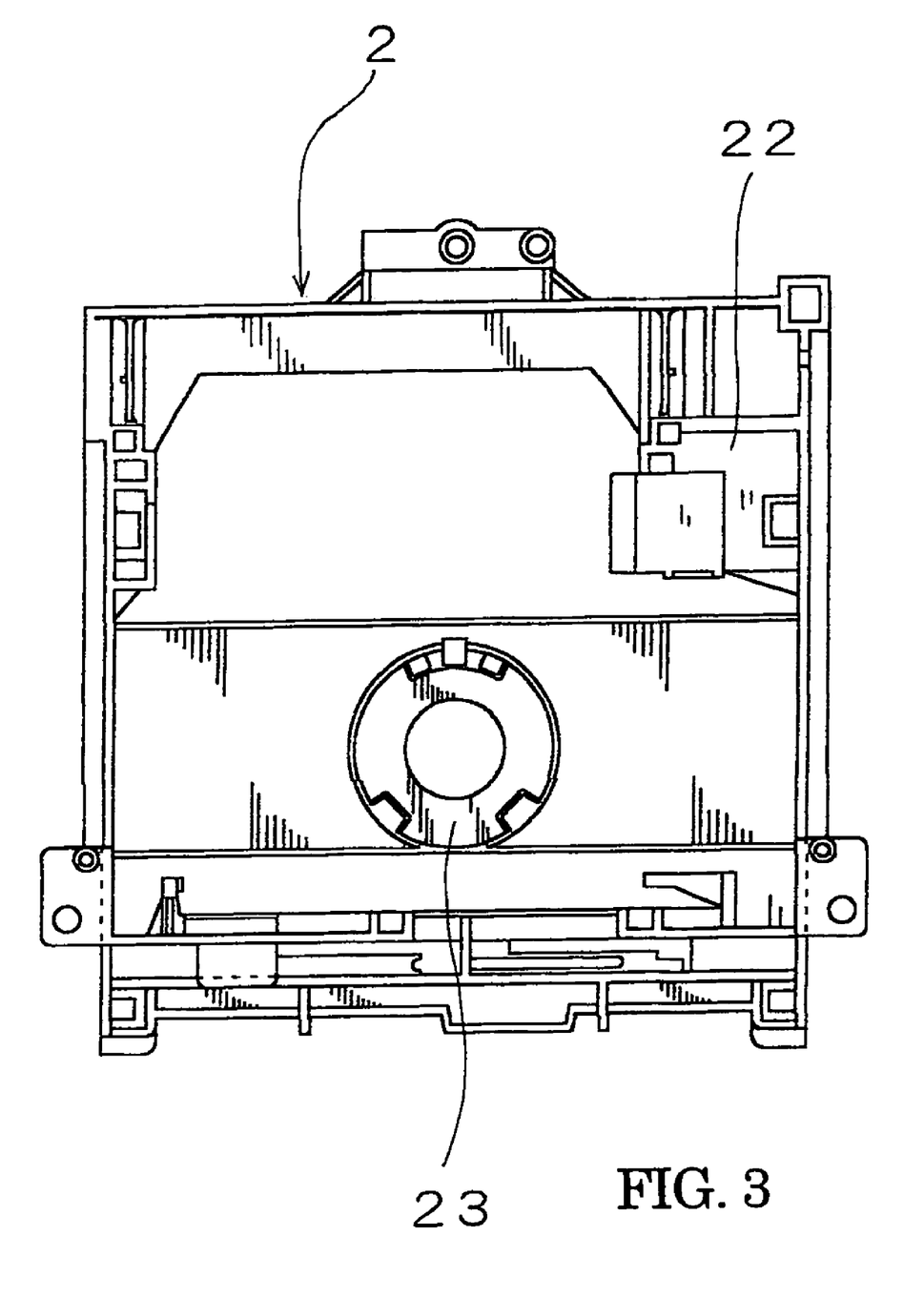
FIG. 3 is a schematic bottom view of the main chassis before mounting the drive chassis thereto.

As shown in FIG. 2 and FIG. 3, the main chassis 2 comprises, at an approximately central portion thereof, a support 23 for supporting a clamp. Further, as shown in FIG. 1 and FIG. 2, the drive chassis 1 has an opening 3 at an inner portion of the apparatus as seen in a tray insertion direction (disc insertion direction). The drive chassis 1 further has, at opposite ends thereof in a direction perpendicular to the tray insertion direction, pivot shafts 30 which extend in the direction perpendicular to the tray insertion direction and pivot relative to the main chassis 2. This drive chassis 1 holds an optical pickup unit, an optical disc drive and a turntable rotated by this optical disc drive, which are not shown in from FIG. 1 to FIG. 3.

When a tray having a DVD mounted thereon is inserted into a given position of the drive chassis 1, the drive chassis 1 is so driven by a motor (not shown) for opening and closing the tray as to pivot about an axis of each pivot shaft 30 in a direction perpendicular to the tray insertion direction shown in FIG. 1. Thereby, the DVD on the tray is sandwiched between the turntable of the drive chassis 1 and the clamp of the main chassis 2. The driving force of the above-described motor for opening and closing the tray is transferred to each pivot shaft 30 through a cam and a pivot gear (not shown).

Figure 4A:
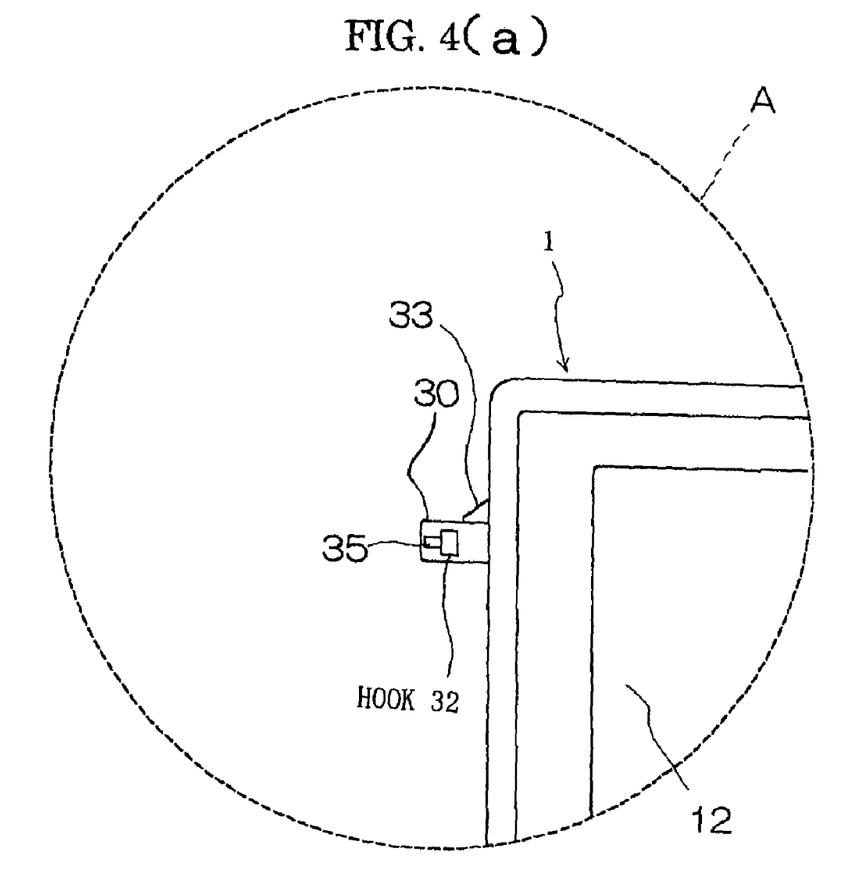
Figure 4B:
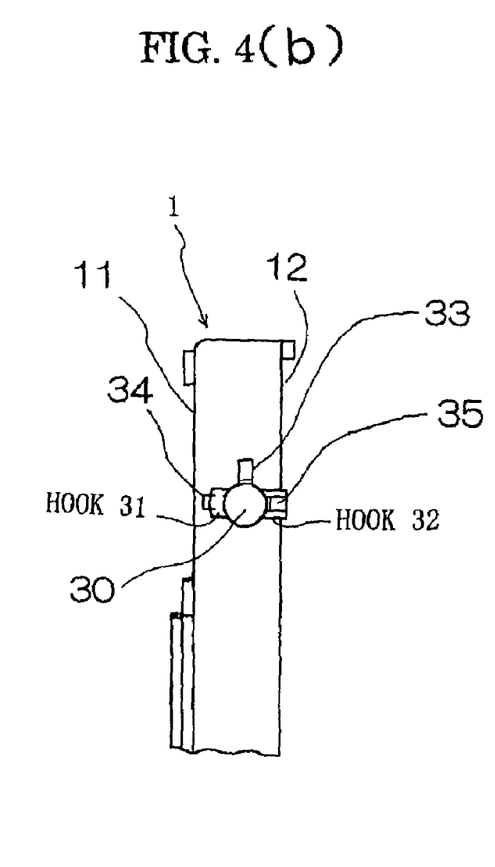
Figure 5:
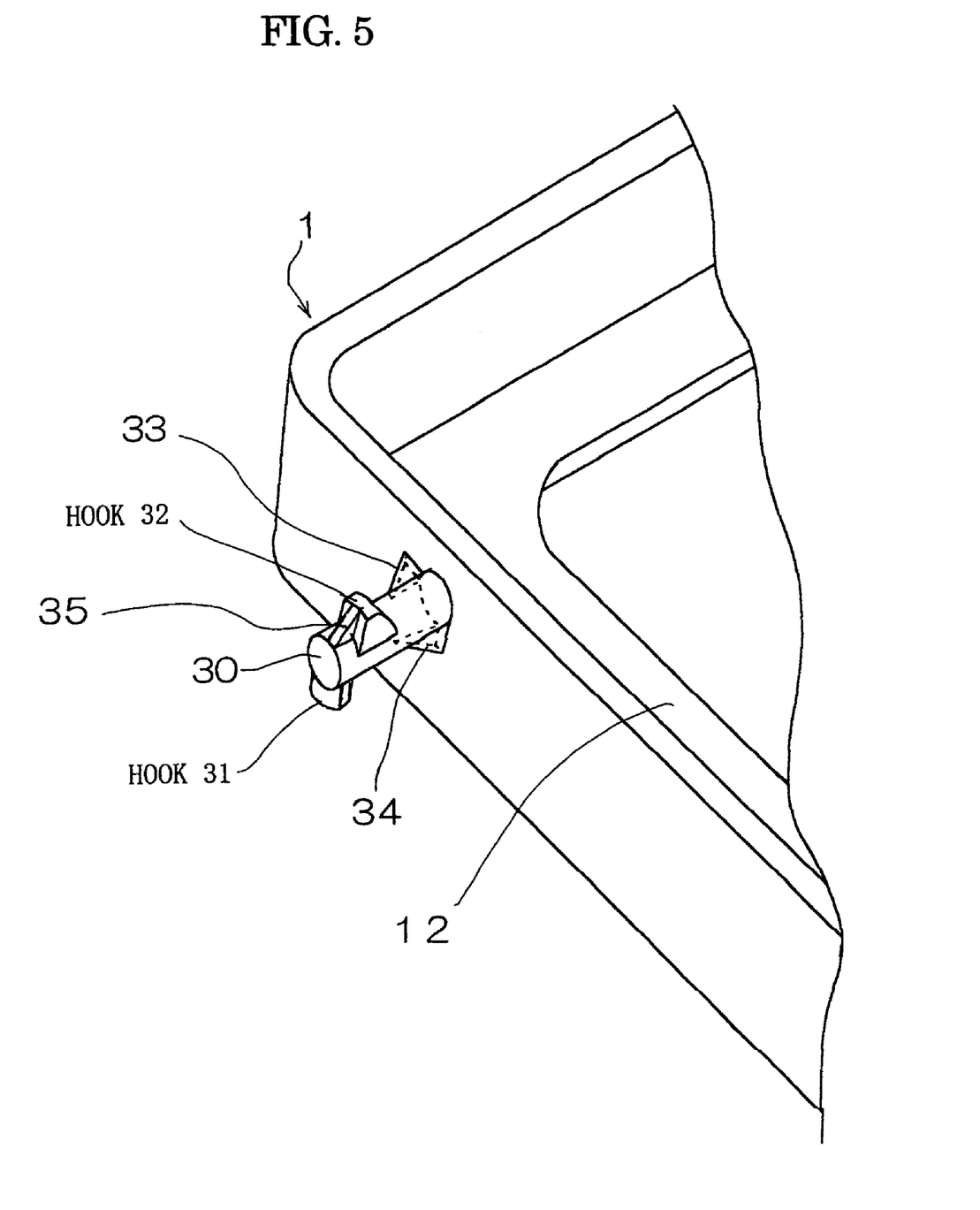
FIG. 5 is an enlarged schematic perspective view of a portion of the drive chassis showing one of the pivot shafts.

Next, referring to FIGS. 4(a), 4(b) and FIG. 5, the structure of each of the above-described pivot shafts 30 will be described. FIGS. 4(a) and 4(b) are an enlarged top plan view and an enlarged side view, respectively, of a portion of the drive chassis 1 corresponding to a dotted circle A in FIG. 2 before mounted to the main chassis 2. FIG. 5 is an enlarged perspective view of a portion of the drive chassis 1 showing one of the pivot shafts 30. The pivot shaft 30 has a hook 31 and a hook 32 at a rear side 11 and a front side 12, respectively, of the drive chassis 1. These hooks 31 and 32 are used for preventing the drive chassis 1 from falling off the main chassis 2 in case the apparatus drops. The pivot shaft 30 furthermore has ribs 33 and 34 for reinforcing the pivot shaft 30 and a rib 35 for reinforcing the hook 32.

Figure 6:
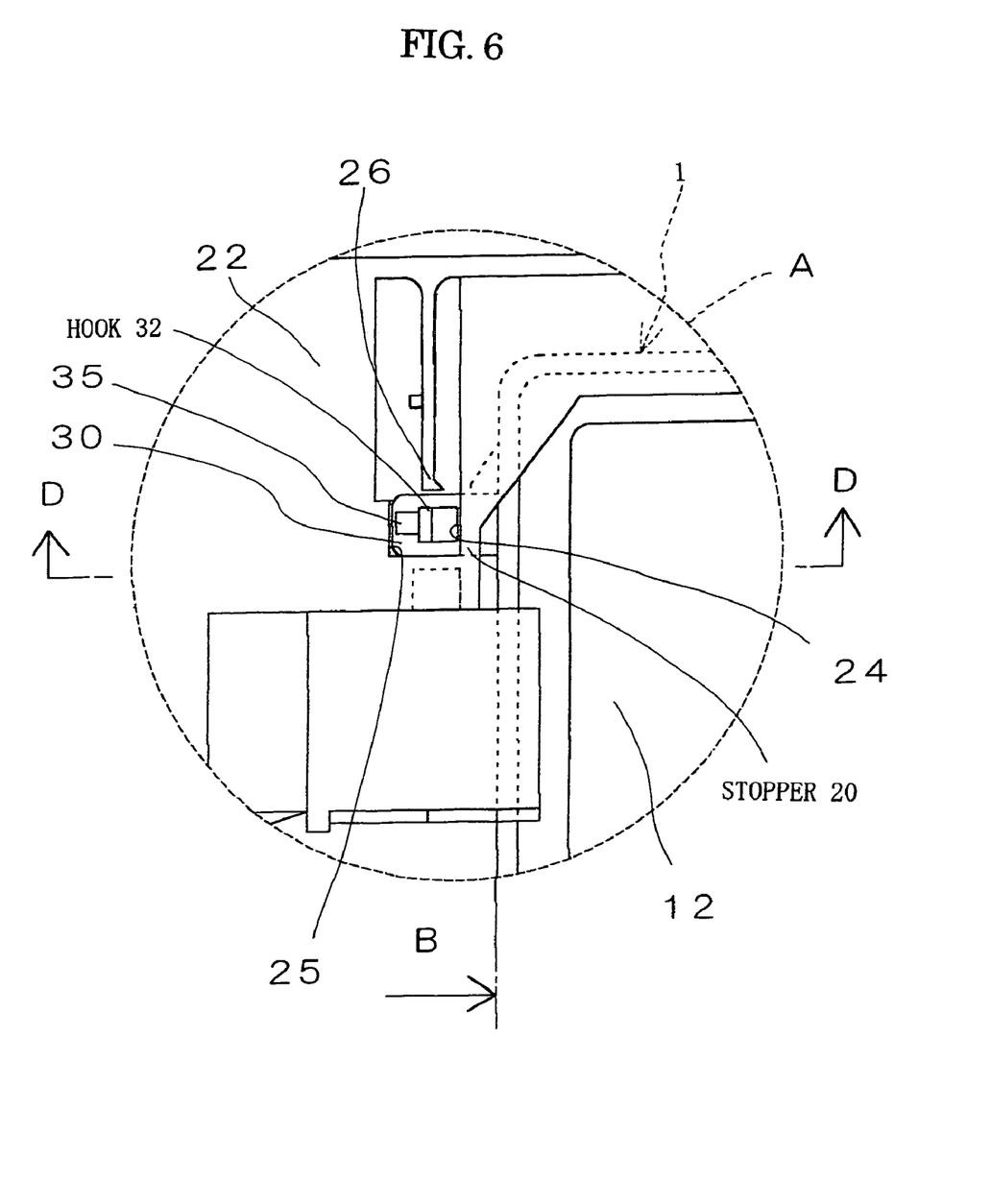
FIG. 6 is an enlarged schematic top plan view of the portion of the dotted circle A shown in FIG. 2.
Figure 7:
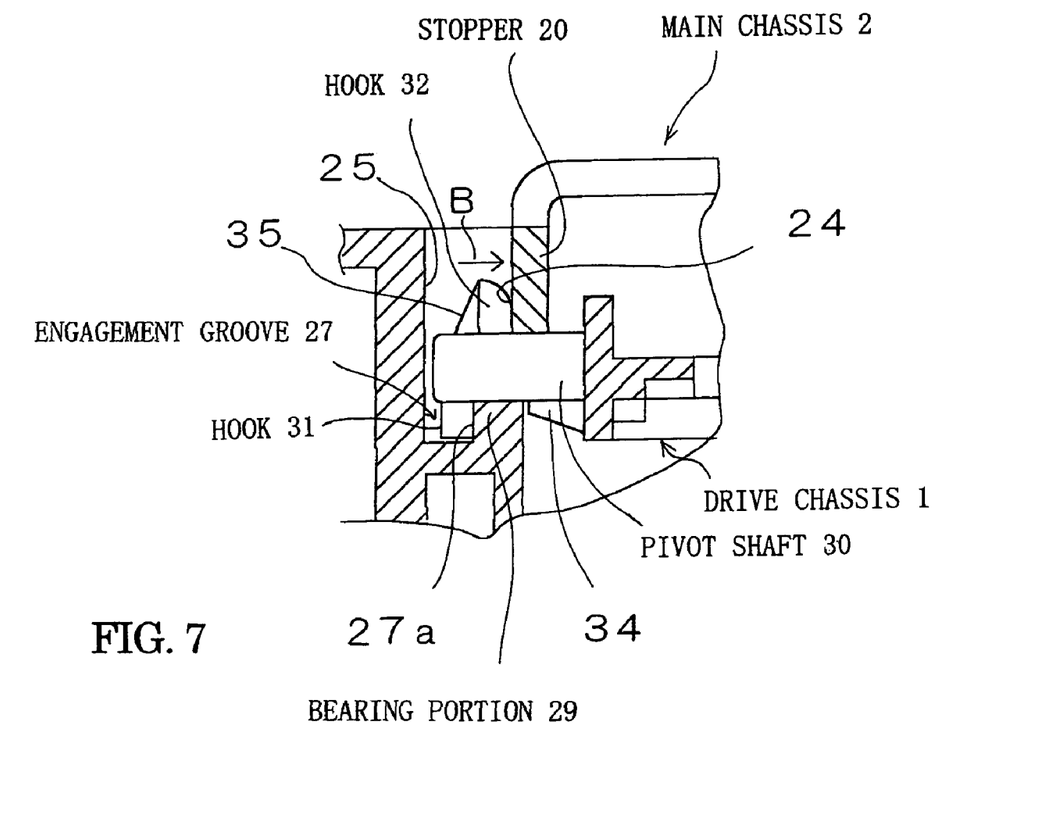
FIG. 7 is a schematic cross-sectional view taken along a D—D line in FIG. 6.

In the following, referring to FIG. 6 and FIG. 7, the function of the hooks 31 and 32 will be described in the case where a force in a direction perpendicular to the optical disc insertion direction is applied to the drive chassis 1. FIG. 6 is an enlarged top plan view of the portion of the dotted circle A shown in FIG. 2, while FIG. 7 is a cross-sectional view taken along a D—D line in FIG. 6. As shown in FIG. 7, the main chassis 2 has a stopper 20 to prevent positional slippage of the pivot shaft 30 and a bearing portion 29 to support the pivot shaft 30. The bearing portion 29, furthermore, has an engagement groove 27 to be engaged with the hook 31 of the drive chassis 1.

In case the DVD player having the above-described structure drops in a manner that a force is applied to the drive chassis 1 in a direction B perpendicular to the optical disc insertion direction as shown in FIG. 7, the hook 31 and the hook 32 of the drive chassis 1 are abutted against and stopped by an inner wall 27a of the engagement groove 27 and a side wall 24 of the stopper 20, respectively, of the main chassis 2. Accordingly, the drive chassis 1 and the pivot shaft 30 can be prevented from positional slippage relative to the main chassis 2. Thus, although the drive chassis 1 has flexibility, the drive chassis 1 and the other pivot shaft 30 (that is the pivot shaft 30 positioned opposite to the pivot shaft 30 shown in FIG. 7) can be prevented from being pressed against the main chassis 2 to become bent, even in case the DVD player drops. Hence, each of the pivot shafts 30 of the drive chassis 1 can be prevented from slipping off the bearing portion 29 of the main chassis 2 to cause the drive chassis 1 to fall off the main chassis 2.

Meanwhile, as shown in FIG. 6, the main chassis 2 has a stopper portion 26 for preventing the drive chassis 1 from falling therefrom. In case the DVD player drops in a manner that a force is applied to the drive chassis 1 in a direction parallel to the optical disc insertion direction (that is direction perpendicular to the direction B shown in FIG. 6), the stopper portion 26 suppresses each of the pivot shafts 30 from moving in a direction parallel to the optical disc insertion direction. Thus, it is possible to prevent each of the pivot shafts 30 of the drive chassis 1 from slipping off the bearing portion 29 (refer to FIG. 7) of the main chassis 2 to cause the drive chassis 1 to fall off the main chassis 2.

As described in the foregoing, the DVD player according to the present embodiment is so designed that each of the pivot shafts 30 of the drive chassis 1 has the hooks 31 and 32 for the drive chassis 1 to be held by the main chassis 2, and that when a force is applied to the drive chassis 1 in a direction perpendicular to the optical disc insertion direction, the hook 31 of either one of the pivot shafts 30 which are parts of the drive chassis 1 is abutted against and stopped by the corresponding engagement groove 27 of the main chassis 2 while the hook 32 of the same pivot shaft 30 is abutted against and stopped by the corresponding stopper 20 of the main chassis 2. Thus, even in case the DVD player drops, each of the pivot shafts 30 of the drive chassis 1 can be prevented from slipping off the bearing portion 29 of the main chassis 2 to cause the drive chassis 1 to fall off the main chassis 2.

Furthermore, since the hook 32, of each pivot shaft 30 is designed to have the rib 35 integrally formed with the hook 32, the hook 32 can be reinforced by the rib 35, whereby damage of the hook 32 can be prevented in case the DVD player drops. In addition, since each pivot shaft 30 is designed to have the ribs 33 to 35, each pivot shaft 30 can be reinforced by the ribs 33 to 35, whereby damage of each pivot shaft 30 can be prevented in case the DVD player drops.

Note here that the present invention is not limited to the above-described specific embodiment, and that various modifications are possible. For example, in the above embodiment, the main chassis 2 has the engagement groove 27 and the stopper 20 for the purpose of preventing the drive chassis 1 from falling off the main chassis 2. However, the structure of the main chassis can be modified, e.g., such that the main chassis has only one of the engagement groove and the stopper. Furthermore, in the above embodiment, each pivot shaft 30 of the drive chassis 1 has two hooks and three ribs. However, the number of hooks and ribs of each pivot shaft are not limited thereto. Moreover, it is not always necessary for the pivot shaft to have any rib. In the above embodiment, furthermore, only the hook 32 out of the hooks 31 and 32 of each pivot shaft 30 has the rib 35 for reinforcement. However, it is possible for every hook to have such reinforcement rib. Contrarily, it is also possible that none of the hooks has any reinforcement rib.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising:
    a turntable for mounting an optical disc thereon;
    an optical pickup unit for reading out information recorded on the optical disc mounted on the turntable;
    an optical disc drive for rotating the turntable;
    a drive chassis formed of resin and provided for holding the turntable, the optical pickup unit and the optical disc drive, the drive chassis having pivot shafts at both ends thereof extending in a direction perpendicular to an optical disc insertion direction; and
    a main chassis having bearing portions for pivotably supporting the drive chassis,
    wherein each of the pivot shafts of the drive chassis has a hook to allow the drive chassis to be held by the main chassis, and
    wherein when a force is applied to the drive chassis in a direction perpendicular to the optical disc insertion direction, the hook of one of the pivot shafts which are parts of the drive chassis is stopped by the main chassis for preventing the drive chassis from falling off the main chassis.

2. The optical disc apparatus according to claim 1, wherein each of the bearing portions has an engagement groove, such that when a force is applied to the drive chassis in a direction perpendicular to the optical disc insertion direction, the hook of one of the pivot shafts which are parts of the drive chassis is stopped by an inner wall of the engagement groove.

3. The optical disc apparatus according to claim 2, wherein the main chassis has stoppers for preventing positional slippage of the pivot shafts, respectively, such that when a force is applied to the drive chassis in a direction perpendicular to the optical disc insertion direction, the hook of one of the pivot shafts of the drive chassis is stopped by one of the stoppers.

4. The optical disc apparatus according to claim 3, wherein each of the pivot shafts has a rib.

5. The optical disc apparatus according to claim 4, wherein the hook of each of the pivot shafts has a rib.

6. The optical disc apparatus according to claim 3, wherein the hook of each of the pivot shafts has a rib.

7. The optical disc apparatus according to claim 2, wherein each of the pivot shafts has a rib.

8. The optical disc apparatus according to claim 7, wherein the hook of each of the pivot shafts has a rib.

9. The optical disc apparatus according to claim 2, wherein the hook of each of the pivot shafts has a rib.

10. The optical disc apparatus according to claim 1, wherein the main chassis has stoppers for preventing positional slippage of the pivot shafts, respectively, such that when a force is applied to the drive chassis in a direction perpendicular to the optical disc insertion direction, the hook of one of the pivot shafts of the drive chassis is stopped by one of the stoppers.

11. The optical disc apparatus according to claim 10, wherein each of the pivot shafts has a rib.

12. The optical disc apparatus according to claim 11, wherein the hook of each of the pivot shafts has a rib.

13. The optical disc apparatus according to claim 10, wherein the hook of each of the pivot shafts has a rib.

14. The optical disc apparatus according to claim 1, wherein each of the pivot shafts has a rib.

15. The optical disc apparatus according to claim 14, wherein the hook of each of the pivot shafts has a rib.

16. The optical disc apparatus according to claim 1, wherein the hook of each of the pivot shafts has a rib.

17. An optical disc apparatus comprising:
    a turntable for mounting an optical disc thereon;
    an optical pickup unit for reading out information recorded on the optical disc mounted on the turntable;
    an optical disc drive for rotating the turntable;
    a drive chassis formed of resin and provided for holding the turntable, the optical pickup unit and the optical disc drive, the drive chassis having pivot shafts at both ends thereof extending in a direction perpendicular to an optical disc insertion direction; and
    a main chassis having bearing portions for pivotably supporting the drive chassis,
    wherein the pivot shafts of the drive chassis have hooking means for preventing the drive chassis from falling off the main chassis.

* * * * *